(12) United States Patent
Newby, Sr.

(10) Patent No.: US 6,381,819 B1
(45) Date of Patent: May 7, 2002

(54) DOUBLE-WALLED BLOW-MOLDED ARTICLE WITH INSERTABLE HANDLE AND METHOD FOR MAKING SAME

(75) Inventor: J. Parks Newby, Sr., Raleigh, NC (US)

(73) Assignee: Delta Consolidated Industries, Raleigh, NC (US)

( * ) Notice: Subject to any disclaimer, the term of this patent is extended or adjusted under 35 U.S.C. 154(b) by 0 days.

(21) Appl. No.: 09/723,032

(22) Filed: Nov. 27, 2000

Related U.S. Application Data (62) Division of application No. 09/013,243, filed on Jan. 26, 1998, now Pat. No. 6,152,317.

(51) Int. Cl.$^7$ .............................................. B21D 53/40
(52) U.S. Cl. ............................................. 29/11; 403/28
(58) Field of Search ........................... 29/447, 11, 434; 403/28, 273; 220/840–842, 836; 264/242, 322, 319

(56) References Cited

U.S. PATENT DOCUMENTS

| | | | |
|---|---|---|---|
| 2,677,449 A | | 5/1954 | Kiba |
| 2,734,222 A | | 2/1956 | Kiba |
| 3,015,856 A | * | 1/1962 | Cohn .......................... 264/535 |
| 3,140,329 A | * | 7/1964 | Nutting ....................... 264/242 |
| 3,452,125 A | * | 6/1969 | Schurman et al. .......... 264/521 |
| 3,818,631 A | * | 6/1974 | Cederholm ................. 446/371 |
| 3,902,628 A | | 9/1975 | Schurman |
| 3,933,269 A | | 1/1976 | Mastrovito |
| 4,021,519 A | * | 5/1977 | Kruegger et al. ........... 264/516 |
| 4,741,032 A | | 4/1988 | Hampton |
| 4,809,874 A | | 3/1989 | Pehr |
| 4,985,962 A | | 1/1991 | Weber |
| 5,125,523 A | | 6/1992 | Kulper |
| 5,146,650 A | | 9/1992 | Robertson |
| 5,628,422 A | | 5/1997 | Garbacik, Jr. et al. |

* cited by examiner

Primary Examiner—Lee Young
Assistant Examiner—Joseph C. Merek
(74) Attorney, Agent, or Firm—Myers Bigel Sibley & Sajovec (57) ABSTRACT

A method of constructing a double-walled blow-molded article with a hinged handle is performed on an article comprising a receiving member and a pinned member. The receiving member is a double-walled blow-molded thermoplastic component having an outer wall, an inner wall, and an open-ended receptacle. The open ended receptacle is defined by an arcuate pocket positioned opposite the open end, a stationary wall extending from the pocket and facing generally in a first direction, and a deflecting wall positioned opposite the stationary wall and facing generally in a second direction opposite the first direction. The pinned member includes a cylindrical pin. The method comprises as a first step passing the cylindrical pin through the open end of the receptacle and into contact with the pocket. Passage of the pin is performed such that the deflecting wall deflects away from the stationary wall as the pin travels between the deflecting wall and said stationary wall, and such that the deflecting wall recovers toward the stationary wall as the pin contacts the pocket. This passing step is carried out as the receiving member remains at an elevated temperature at which the thermoplastic comprising the receiving member has a first elastic modulus.

9 Claims, 7 Drawing Sheets

DOUBLE-WALLED BLOW-MOLDED ARTICLE WITH INSERTABLE HANDLE AND METHOD FOR MAKING SAME

This application is a divisional application of U.S. patent application Ser. No. 09/013,243, filed Jan. 26, 1998, now U.S. Pat. No. 6,152,317.

FIELD OF THE INVENTION

This invention relates generally to hinged articles, and relates more specifically to blow-molded hinged articles.

BACKGROUND OF THE INVENTION

Blow molding is a well-known fabrication method for thermoplastic components. The process generally involves the molding of a hollow tube, or "parison," of molten thermoplastic that is lowered from an overhanging extrusion head to a position between halves of a reciprocating mold. As the mold halves close, air or some other gas is injected into the parison; the increase in air pressure within the parison caused by such injection forces its walls into the contours of the cavities of the mold halves and thus forms the parison into a desired molded shape. The resulting component has molded walls that surround a hollow chamber. Blow molding has proven to be particularly popular for the production of large parts that would require unduly large molding injection molding machines.

One type of blow molding that has been used successfully for large components that require structural rigidity is the so-called "double-walled" blow molding process. In this process, mold halves are most often designed as distinct core and cavity halves (rather than as two cavities, as would be the case for blow-molded bottles or other containers). The core portion of the core mold half extends within the cavity as the mold halves close. In addition, the mold halves for double-walled components are configured so that the molded components have "full-perimeter flash"; i.e., after molding the component has excess material, or "flash", around the perimeter defined by mating surfaces of the mold halves. This contrasts with single-walled components, in which the parison is inflated entirely within closed mold cavities, and the molded component typically has flash only on its top and bottom portions. Blow-molded components have distinct inner and outer walls that surround a hollow space, with the inner wall having been formed by the core and the outer wall having been formed by the cavity, and with the inner and outer walls being separated by the weld line remaining after the flash is removed. In a typical double-walled component the inner and outer walls are positioned proximate to one another and can have "pinched-off" areas, in which the inner and outer walls are contiguous.

One distinct advantage provided by double-walled blow-molded components is the capability for adjacent regions of the inner and outer walls to differ significantly in their localized contour. For example, a region of the outer wall may have a relatively flat profile, while the adjacent region of the inner wall can contain numerous projections, recesses, and the like, with the profile of either localized region failing to impact significantly the appearance or structural integrity of the other. Such differences in localized inner and outer wall contour are less likely to be successfully achieved in injection-molded components because the inclusion of substantial detail in the inner wall can have a deleterious effect on the dimensional stability, appearance, and even strength of the outer wall. Another performance advantage conveyed by double-walled components stems from the formation of the hollow chamber within the inner and outer walls, as it can provide an air cushion that protects items contacting the inner wall.

For these reasons, double-walled components have proven to be particularly popular for protective containers and carrying cases. Detailed contour that mates with, matches, supports, or captures portions of an item to be carried within the carrying case can be included in the inner wall of the double-walled component even as the outer wall has a generally flat, appearance-sensitive surface. Further, the air cushion between the inner and outer walls helps to protect the item. Thus, the container has the detail and structure necessary to support, transport and protect the item and also provides the desired aesthetic appeal, and does so without the manufacturer having to produce two separate inner wall and outer wall parts.

Many carrying cases have handles to enable the user to more easily pick up, carry, and otherwise manipulate the carrying cases. Some double-walled blow-molded carrying cases include handles that are molded integrally with the body of the case. One example of such a carrying case is illustrated in U.S. Pat. No. 5,361,456 to Newby. The carrying case illustrated therein has a fixed handle that extends away from the body of the carrying case. The handle is formed in each half of the carrying case during the blow molding process by sections of the mold halves that pinch off a portion of the parison that is positioned inward from the outer perimeter of the mold. The pinched-off portion is removed from the molded part to form an opening. The opening and the remaining perimeter portion of the part form the handle for the carrying case.

This design has certain shortcomings, the most prevalent of which is the fact that the handle permanently extends away from the internal storage cavity defined by the halves of the carrying case. In this configuration, the handle cannot be folded to a less extended position for easier storage.

SUMMARY OF THE INVENTION

It is therefore an object of the present invention to provide a double-walled blow molded carrying case with a handle that can be folded for storage.

It is also an object of the present invention to provide a process for producing such a carrying case.

These and other objects are satisfied by the present invention, which is directed to a method of constructing a double-walled blow-molded article with a hinged handle. The method is performed on an article comprising a receiving member and a pinned member. The receiving member is a double-walled blow-molded thermoplastic component having an outer wall, an inner wall, and an open-ended receptacle. The open ended receptacle is defined by an arcuate pocket positioned opposite the open end, a stationary wall extending from the pocket and facing generally in a first direction, and a deflecting wall positioned opposite the stationary wall and facing generally in a second direction opposite the first direction. The pinned member includes a cylindrical pin. The method comprises as a first step passing the cylindrical pin through the open end of the receptacle and into contact with the pocket. Passage of the pin is performed such that the deflecting wall deflects away from the stationary wall as the pin travels between the deflecting wall and said stationary wall, and such that the deflecting wall recovers toward the stationary wall as the pin contacts the pocket. This passing step is carried out as the receiving member remains at an elevated temperature at which the thermoplastic comprising the receiving member has a first elastic modulus. As a second step, the method comprises allowing the receiving member to cool to room temperature such that the thermoplastic comprising the receiving member has a second elastic modulus at room temperature that is lower than the first elastic modulus and that enables the deflecting member to retain the cylindrical pin within the receptacle. In this manner, the hinged article (preferably a hinged carrying case) can be quickly and easily formed as the receiving member exits its mold.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figures 1, 2:
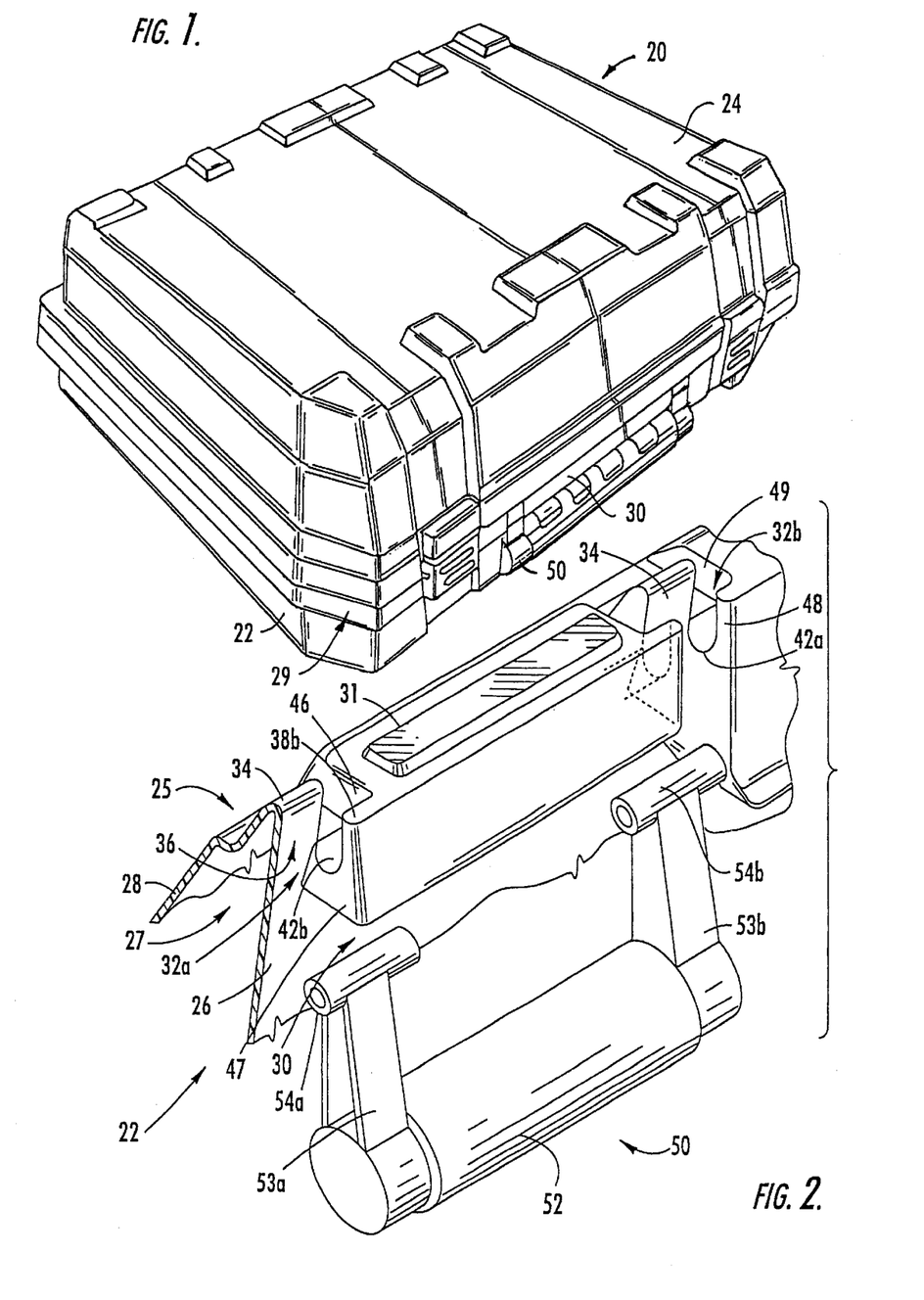
FIG. 1 is a perspective view of a double-walled blow molded carrying case of the present invention.
FIG. 2 is an enlarged partial exploded cutaway view of the handle receiving section and the handle member of the carrying case of FIG. 1.

Referring now to the drawings, a carrying case, designated broadly at 20, is illustrated in FIG. 1. The carrying case 20 includes a container 22 and a cover 24 that is pivotally interconnected with the container 22. The hinge interconnecting the container 22 and the cover 24 (not shown) can be virtually any hinge configuration known by those skilled in this art to be suitable to interconnect such a container and cover; one exemplary hinge configuration is illustrated in U.S. Pat. No. 5,361,456 to Newby. The illustrated carrying case 20 thus has a container cavity 25 (FIG. 2) that is configured to contain, transport, and protect a power tool, such as a power drill. Those skilled in this art will appreciate that a carrying case of the present invention can take a variety of configurations and protect any number of items, such as electronic, computer, video, or camera equipment, sales samples, and the like.

As a double-walled blow-molded part, the container 22 has an outer wall 26 and an inner wall 28 (FIG. 2). As is typical of double-walled blow-molded parts, the outer wall 26 and inner wall 28 are in close proximity to one another and surround an internal cavity 27. The container 22 includes some pinched-off areas (not shown) where the inner and outer walls 26, 28 are contiguous.

The container 22 is formed of a thermoplastic material, preferably polyethylene having room temperature elastic modulus of between about 80,000 and 260,000 psi at room temperature, suitable for blow-molding. Other suitable materials include polypropylene, polystyrene, acrylonitrile-butadiene-styrene (ABS), and copolymers thereof. It is preferred that the cover 24 also be formed of a thermoplastic material and have a double-walled construction, although those skilled in this art will recognize that other materials and structures are also suitable for use in the cover 24.

At the peripheral edge 29 of the container 22 on the side of the container 22 opposite the hinge, the container 22 includes a handle receiving section 30 (FIGS. 2 through 4 and 13). The handle receiving section 30 includes a central portion 31 and a pair of mirror image receptacles 32a, 32b. Those skilled in this art will appreciate that the receptacles 32a, 32b are mirror images about a plane P bisecting the central portion 31 equidistant between the receptacles 32a, 32b. As such, only the receptacle 32a will be described in detail herein; those skilled in this art will understand that this discussion is equally applicable to the receptacle 32b.

Again referring to FIGS. 2 through 4 and 13, the receptacle 32a is defined by a deflecting wall 34, two stationary walls 38a, 38b and two pockets 42a, 42b. The pockets 42a, 42b is preferably and illustratively defined by partial cylindrical surfaces, with cross sections describing a circular arc of approximately 180 degrees. The pockets 42a, 42b are aligned along their longitudinal axes. Other arcuate configurations of the pockets 42a, 42b may also be employed, although it is preferred that the cross-sections of the pockets 42a, 42b define a circular arc of at least 180 degrees. The upper ends of the pockets 42a, 42b merge with respective lower portions of the stationary walls 38a, 38b. The stationary walls 38a, 38b face the deflecting wall 34 and include coplanar and upright bearing surfaces 40a, 40b that are parallel to the longitudinal axes of the pockets 42a, 42b. The deflecting wall 34 is located between the pockets 42a, 42b. The deflecting wall 34 has a bearing surface 36 that faces the direction opposite of the bearing surfaces 40a, 40b. The bearing surfaces 36, 40a, 40b are preferably generally planar, although the skilled artisan will understand that convex and concave bearing surfaces can also be employed.

Figure 3:
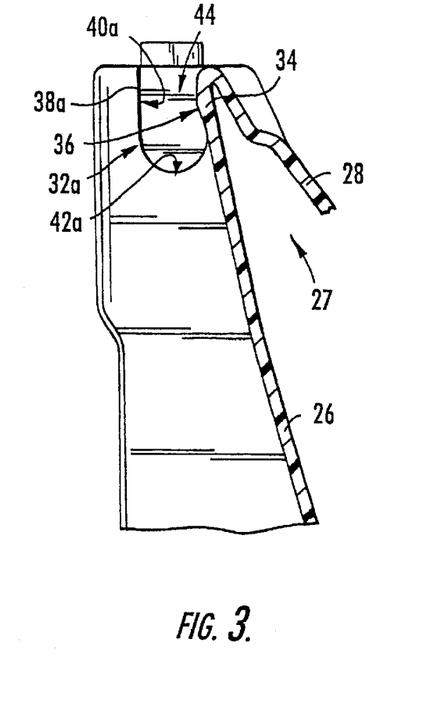
FIG. 3 is a side section view of a receptacle of the carrying case of FIG. 1 prior to the insertion of the handle member.
Figure 13:
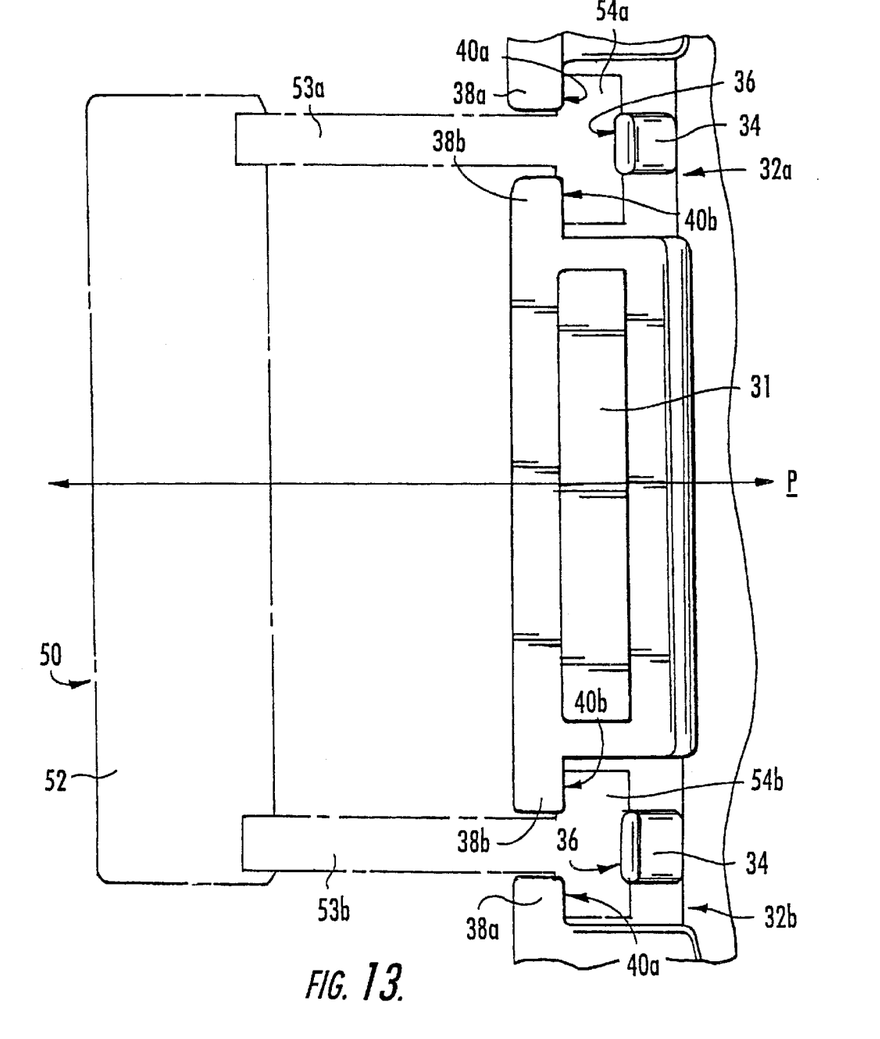
FIG. 13 is a top view of the handle receiving section of the carrying case of FIG. 1.

As best seen in FIGS. 3 and 13, at their upper ends, the deflecting wall 34 and the stationary walls 38a, 38b define an open end 44 of the receptacle 32a. The open end 44 (i.e., the dimension between the bearing surfaces 36, 40) is smaller than the width between the bearing surfaces 36, 40a, 40b at their respective lower portions because the bearing surface 36 is tilted toward the bearing surfaces 40a, 40b.

This difference in width is preferably between about 30 and 40 percent of the width of the lower portions, or about 0.1 and 0.2 inches for the illustrated embodiment. The receptacle 32a also includes internal faces 46, 47 and end faces 48, 49, each of which is normal to the stationary walls 38a, 38b and the longitudinal axes of the pockets 42a, 42b.

Figure 12:
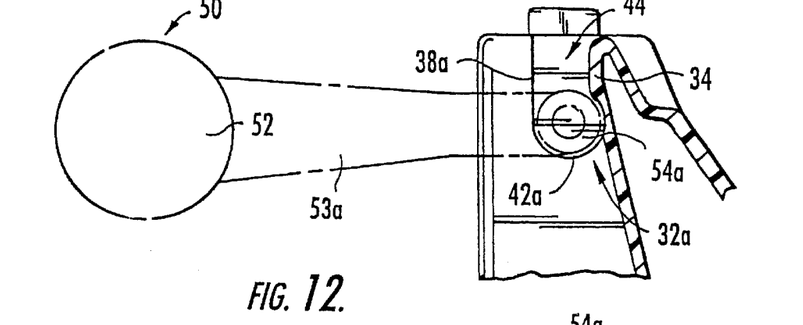
FIG. 12 is a side section view as in FIG. 4 with the handle member (shown in phantom line) in an extended position.

A handle member 50 (FIGS. 2, 12 and 13) is pivotally attached to the container 22 for easy handling of the carrying case 20. The handle member 20 includes an elongate grip segment 52. Extensions 53a, 53b extend from the respective ends of the grip segment 52 in a direction generally perpendicular to the longitudinal axis of the grip segment 52. At each of the free ends of each of the extensions 53a, 53b, a respective pin 54a, 54b extends in both directions generally parallel to the grip segment 52.

Figure 4:
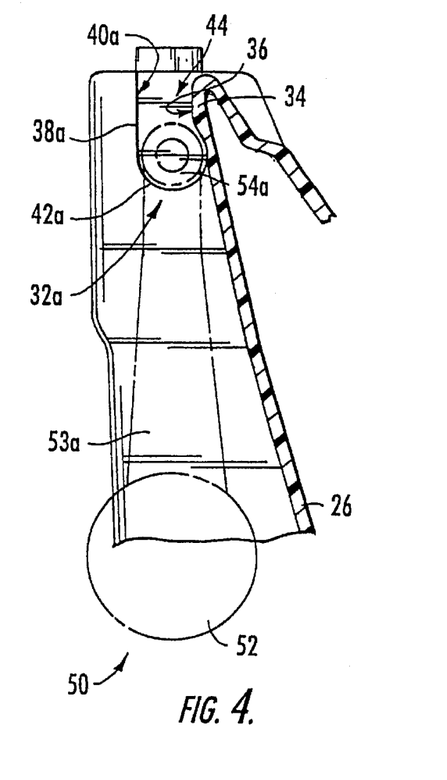
FIG. 4 is a side section view as in FIG. 3 with the handle member (shown in phantom line) inserted into the receptacle and in its retracted position.

The handle member 50 is attached to the container 22 such that the ends of the pins 54a, 54b are inserted into respective pockets 42a, 42b of the receptacles 32a, 32b (FIGS. 1 and 4). The pins 54a, 54b fit and pivot within the pockets 42a, 42b, thereby enabling the handle member 50 to pivot relative to the container 22 about the longitudinal axes of the pockets 42a, 42b. This configuration enables the handle member 50 to take a gripping position, in which the grip segment 52 is spaced apart from the case outer wall 26 (FIG. 12), and a storage position (FIGS. 1 and 2), in which the grip segment 52 is adjacent the outer wall 26 beneath the handle receiving section 30. Thus, the problem present in prior art carrying cases (namely, the inability to fold the handle away from an extended gripping position during storage) is addressed.

Figure 5:
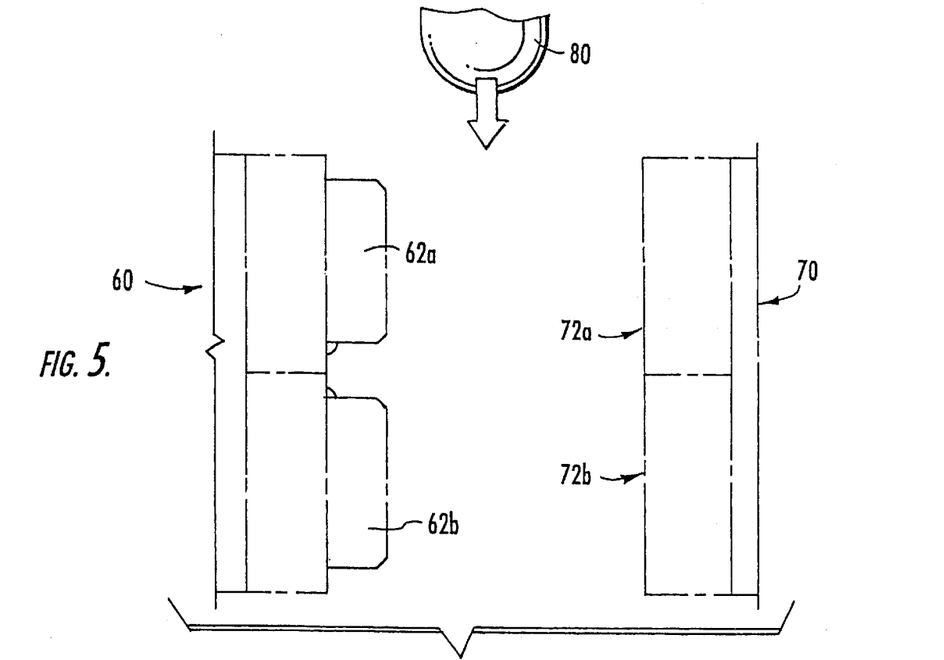
FIG. 5 is a schematic side view of the double-walled blow molding process for forming the carrying case of FIG. 1, with the mold halves being open prior to the parison being lowered therebetween.

The process for blow-molding the container 22 and cover 24 can be best understood by reference to FIGS. 5 through 8. FIG. 5 schematically illustrates a pair of reciprocating mating mold halves 60, 70. The mold halves 60, 70 are mounted on and reciprocated within a blow-molding machine (not shown) of a type and configuration known to those skilled in this art. Such a molding machine includes an overhead, vertically-directed extrusion head (not shown) that can produce a tubular thermoplastic parison 80 (see FIGS. 5 and 6).

Figure 6:
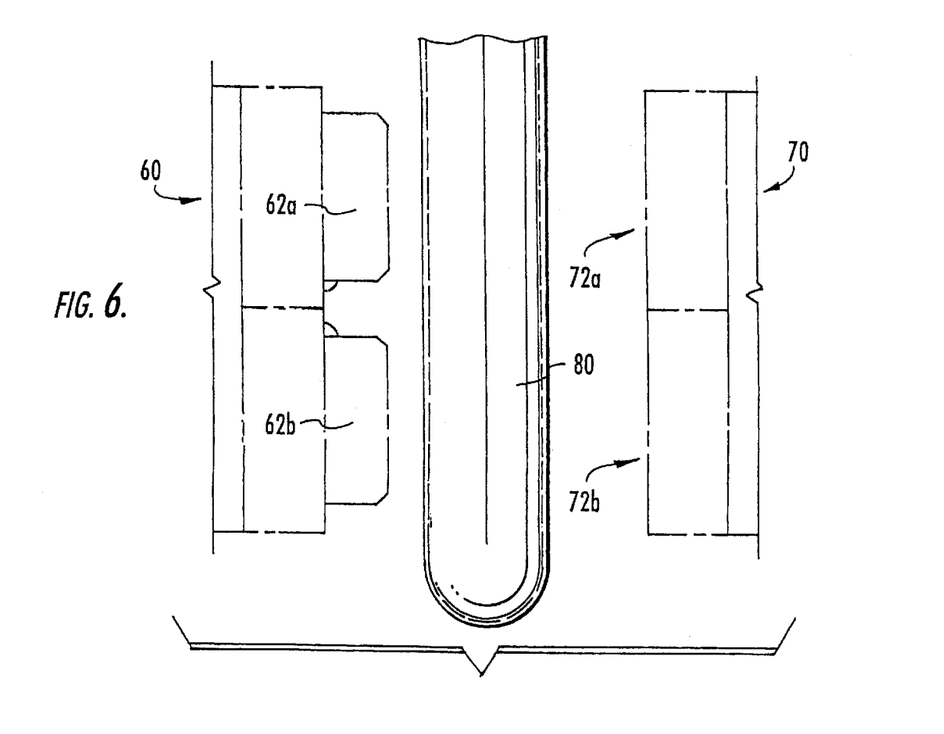
FIG. 6 is a schematic side view of the mold halves and parison of FIG. 5 with the parison lowered between the mold halves as they are in an open position.

Referring to FIGS. 5 and 6, the mold half 60 includes a pair of cavity portions 62a, 62b that are recessed from and within the frame of the mold half 60 itself. The cavity portions 62a, 62b includes contour and detail that is to be formed onto the outer walls 26 of the container 22 and the cover 24.

The mold half 60 also includes two identical inserts 64a, 64b in the upper cavity portion 62a (see FIGS. 9 and 10), only one of which will be described in detail herein. The insert 64a includes a pair of projections 65a, 65b with opposed contact surfaces 66a, 66b and a sloping deflecting wall forming surface 68 positioned between the contact surfaces 66a, 66b. The inserts 64a, 64b are positioned in the upper cavity portion 62a so they can contribute to the formation of the receptacles 30a, 30b.

The mold half 60 further includes cooling lines 69 (illustrated schematically in FIG. 8) which remove heat from the mold half 60 that is generated by repeated contact with molten thermoplastic parisons. Those skilled in this art will recognize that other cooling line configurations are also suitable for use with the present invention.

The mold half 70 (FIGS. 5 and 6) includes core portions 72a, 72b that extend away from the frame of the mold half 70 and toward the mold half 60. The core portions 72a, 72b include contour and detail for forming the inner walls 28 of the container 22 and cover 24. The mold half 70 also includes a cooling circuit 79 (FIG. 8) to remove heat generated by repeated contact with parisons.

The mold half 70 further includes two identical inserts 74a, 74b in its upper core position 72a, only one of which will be described in detail herein. The insert 74a (FIGS. 9 and 10) includes a pair of facing contact surfaces 76a, 76b and a pair of pocket forming projections 78a, 78b. The insert 74a is positioned in the upper core portion 72a to mate with the insert 64a such that the contact surfaces 76a, 76b brush against the contact surfaces 66a, 66b during molding.

Figure 7:
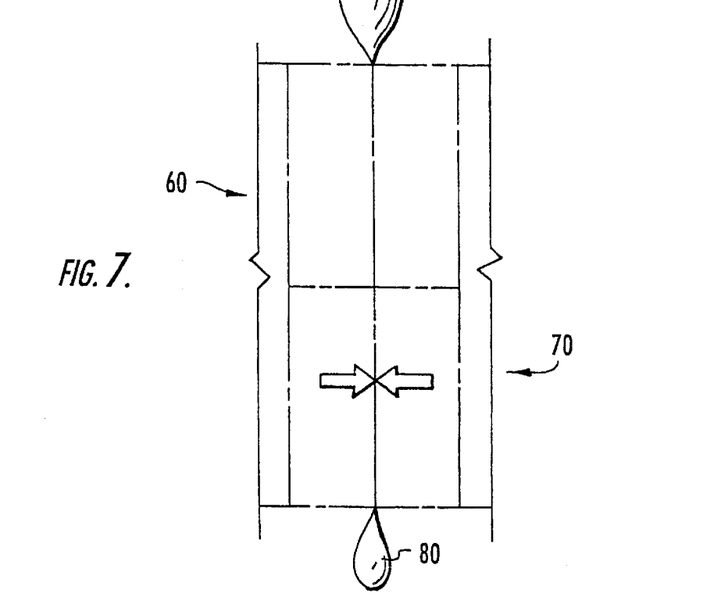
FIG. 7 is a schematic side view of the mold halves and parison of FIG. 5 with the mold halves in a closed position.

To initiate a molding cycle, the parison 80 of thermoplastic material is lowered from the extrusion head to a position between the mold halves 60, 70 (FIGS. 5 and 6). Once the parison 80 has reached a position between the mold halves 60, 70, the mold halves 60, 70 close upon it (FIG. 7). This action pinches the parison 80 at its top and bottom portions and at lateral portions therebetween, thereby forming the aforementioned full-perimeter flash. In addition, a gas is introduced into the parison 80 through an inlet (not shown) in the extrusion head. Injection of this gas (preferably air or nitrogen) inflates the parison, which in turn forces the parison 80 against the cavity portions 62a, 62b and the core portions 72a, 72b of the mold halves 60, 70. As the parison 80 is forced against the core and cavity portions 62a, 62b, 72a, 72b, it takes the contour of these parts of the mold halves 60, 70.

Figure 9:
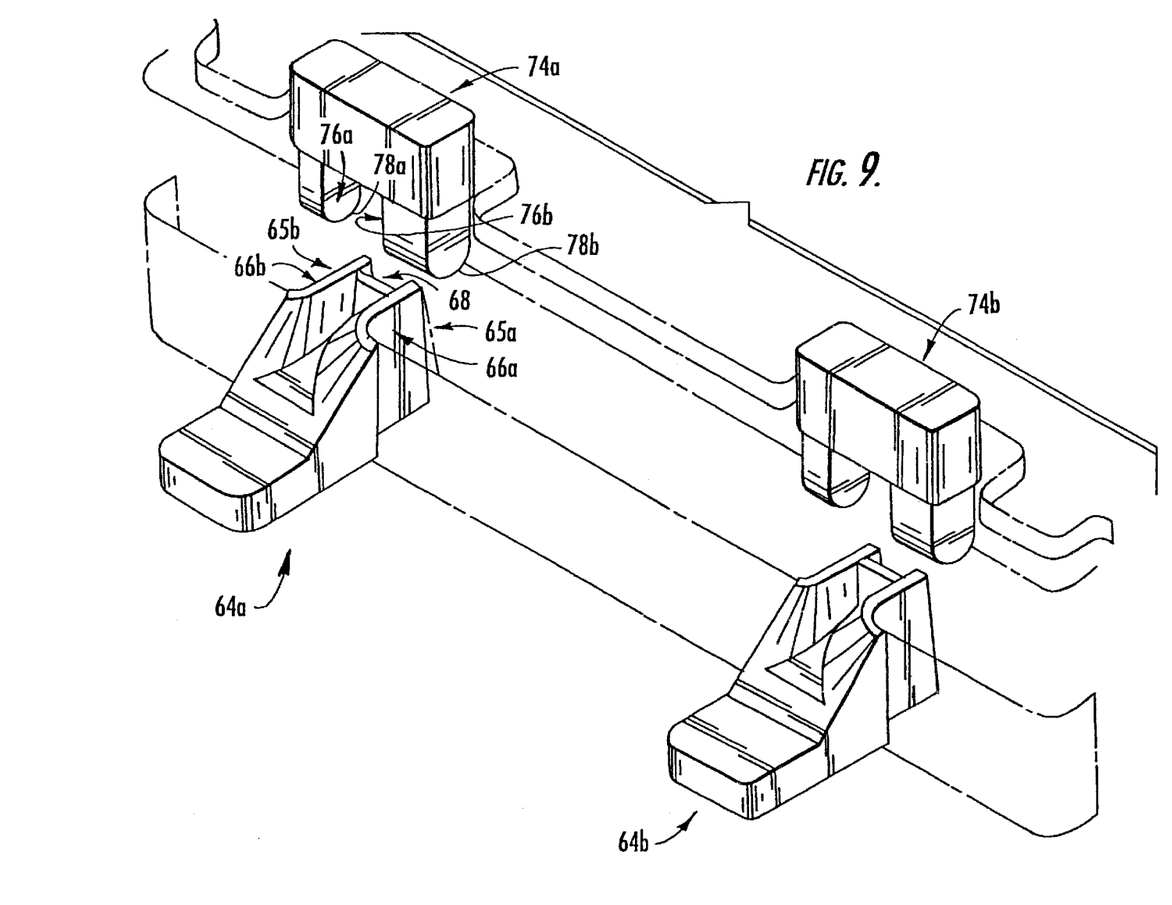
FIG. 9 is an enlarged perspective view of the mold inserts used in the molds in FIGS. 5–8.
Figure 10:
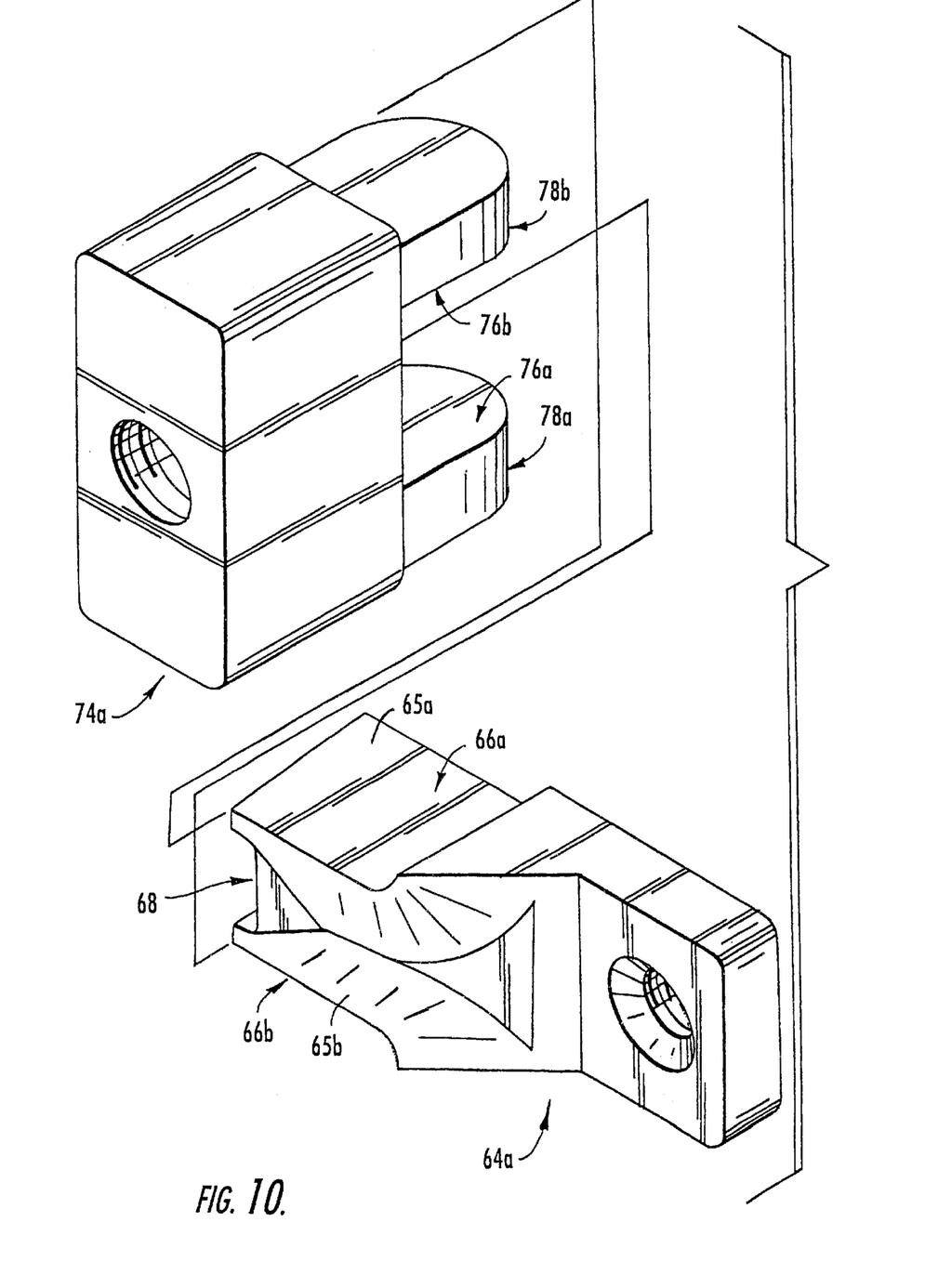
FIG. 10 is an enlarged exploded view of one set of the mold inserts shown in FIG. 9.

As the mold halves 60, 70 close, the insert 64a mates with the insert 74a; similarly, the insert 64b mates with the insert 74b. As the inserts 64a, 74a mate, their contact surfaces 66a, 66b, 76a, 76b brush against each other. As a result, thermoplastic from the parison 80 is blocked from penetrating and flowing between the contact surfaces. The pocket forming surfaces 78a, 78b form the pockets 42a, 42b and the adjoining stationary walls 38a, 38b. The deflecting wall forming surface 68 forms the deflecting wall 34.

Figure 8:
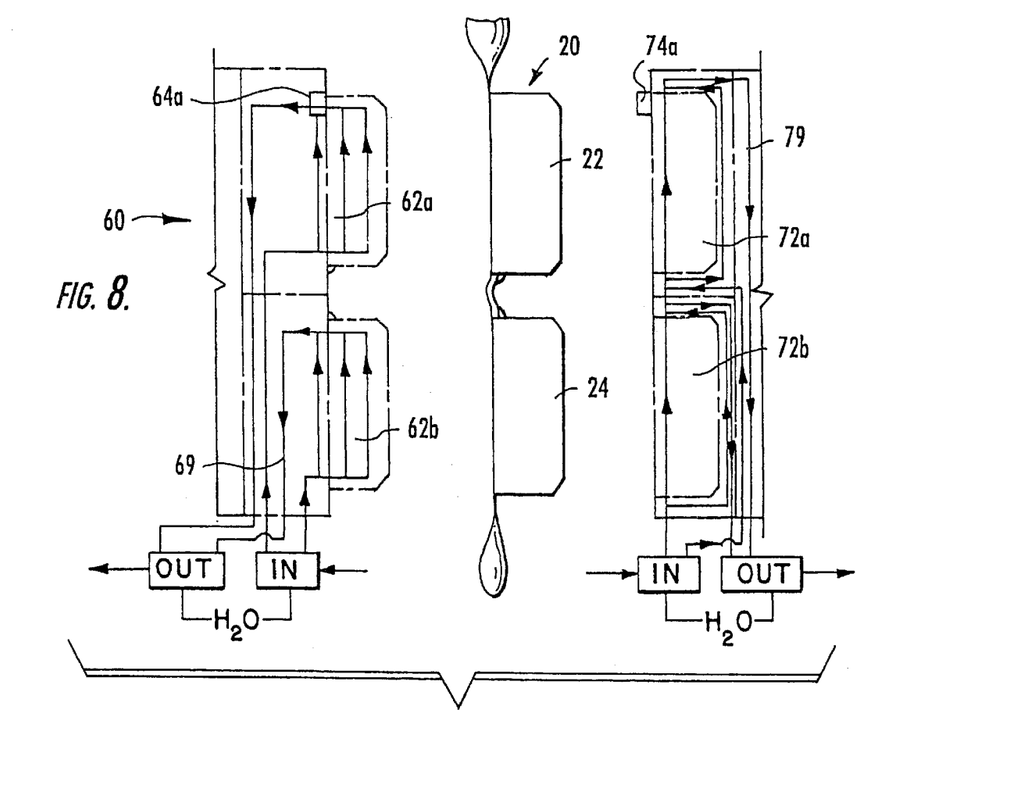
FIG. 8 is a schematic side view of the mold halves of FIG. 5 showing the mold halves in an open position and the parison molded into the container and cover of the carrying case of FIG. 1.

The mold halves 60, 70 remain closed until the thermoplastic material has cooled sufficiently to be handled without affecting its new configuration. The mold halves 60, 70 then open, and the container 22 and cover 24 are ejected (FIG. 8).

After molding, the container 22 and cover 24, which are spaced apart by a section of flash material 82, are separated and assembled. Also, sections of flash material 84 that extend from the lower edge of the cover 24, the upper edge of the container 22, and the lateral edges of each are removed.

Notably, the mold halves 60, 70 are configured so that the container 22 is molded simultaneously with the cover 24. This dual molding process is preferred, as the appearance of these parts, which can vary slightly based on material lot, mold temperature, mold aging, and other factors, should more closely match one another.

Figure 11:
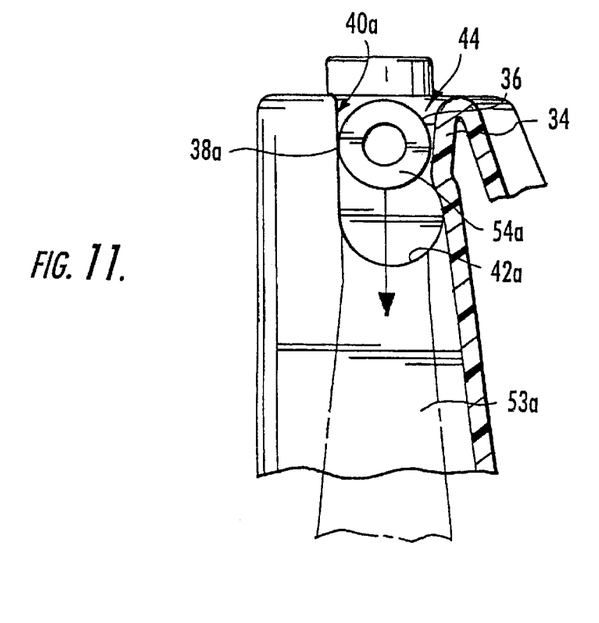
FIG. 11 is a side section view of a carrying case of FIG. 1 showing the insertion of the handle member into a receptacle.

Interconnection of the handle member 50 with the container 22 can be best understood by reference to FIGS. 3, 4 and 11. As the container 22 is ejected from the mold halves 60, 70, the thermoplastic comprising the container 22 has frozen, but is still hot. The temperature of the thermoplastic depends on the type of thermoplastic used; for polyethylene, the temperature is generally between about 100 and 150 degrees Fahrenheit. Because it is well above room temperature, the thermoplastic has a lower elastic modulus than it would at room temperature. As such, the structures of the container 22, and in particular the deflecting wall 34, are more flexible immediately after ejection than after cooling to room temperature. Thus, as each of the pins 54a, 54b of the handle member 50 is forced through the open end of a respective receptacle 32a, 32b, each deflecting wall 34 deflects such that its upper end travels away from the stationary walls 38a, 38b it faces. This movement enables each pin 54a, 54b to pass between the stationary walls 38a, 38b and the deflecting wall 34 (FIG. 11) and into its pockets 42a, 42b (FIG. 4). In this position, the pins 54a, 54b can rotate within their pockets 42a, 42b, thereby enabling the handle member 50 to rotate between extended (FIG. 12) and retracted (FIG. 11) positions.

Once the pins 54a, 54b are in their respective pockets 42a, 42b the deflecting walls 34 return to their original positions to decrease the width of the open ends 44 of the pockets 42a, 42b. This movement retains the pins 54a, 54b in the pockets 42. As the container 22 cools, the elastic modulus of the thermoplastic continues to rise until the container 22 reaches room temperature. The increased stiffness of the thermoplastic assists the handle member 50 in remaining in place. Preferably, the ejection temperature of the thermoplastic is selected so that the ratio between the ejection temperature elastic modulus and the room temperature elastic modulus is between about 1.5 to 1 and 10 to 1. Of course, this method can be carried out after the container 22 cools, but the insertion force required is typically much higher.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein. In the claims, means-plus-function clauses are intended to cover the structures described herein as performing the recited function and not only structural equivalents but also equivalent structures.

That which is claimed is:

1. A method of constructing a hinged article, said article comprising a receiving member and a pinned member, said receiving member being a double-walled blow-molded thermoplastic component having an outer wall, an inner wall, and an open-ended receptacle defined by an arcuate pocket positioned opposite an open end, a stationary wall extending from said pocket and facing generally in a first direction, and a deflecting wall positioned opposite said stationary wall, and facing generally in a second direction opposite said first direction, said pinned member including a cylindrical pin having a longitudinal axis, said method comprising the steps of:

passing said cylindrical pin in a direction generally normal to the longitudinal axis thereof through the open end of said receptacle and into contact with said pocket such that said deflecting wall deflects away from said stationary wall as said pin travels between said deflecting wall and said stationary wall, and such that said deflecting wall recovers toward said stationary wall as said pin contacts said pocket, said passing step being carried out as said receiving member remains at an elevated temperature at which said thermoplastic comprising said receiving member has a first elastic modulus; and allowing said receiving member to cool to room temperature such that said thermoplastic comprising said receiving member has a second elastic modulus at room temperature that is lower than said first elastic modulus and that enables said deflecting wall to retain said cylindrical pin within said receptacle and enables said pinned member to rotate relative to said receiving member about said longitudinal axis.

2. The method defined in claim 1, further comprising the steps of:

providing a mold comprising a pair of mating mold halves, a first of said mold halves including a cavity portion, and a second of said mold halves including a core portion;

lowering a molten thermoplastic parison between the mold halves;

closing the mold halves to capture a portion of the parison therebetween so that the core portion of the second mold half extends within the cavity portion of the first mold half; and inflating the parison to force the parison to contact the core and cavity portions of the mold halves so that said core portion forms the inner wall of said receiving member, and said cavity portion forms said outer wall of said receiving member.

3. The method defined in claim 2, further comprising the step of removing said receiving member from said mold at an elevated temperature.

4. The method defined in claim 1, wherein said thermoplastic comprising said receiving member is selected from the group consisting of: polyethylene, polypropylene, polystyrene, acrylonitrile-butadiene-styrene, and copolymers thereof.

5. The method defined in claim 1, wherein said passing step is performed when said receiving member is at a temperature of at least 100 degrees Fahrenheit.

6. The method defined in claim 1, wherein said arcuate pocket of said receptacle is substantially semicircular.

7. The method defined in claim 1, wherein said thermoplastic has a ratio of said first modulus of elasticity to said second modulus of elasticity of between about 1.5 to 1 and 10 to 1.

8. The method defined in claim 1, wherein the open end of said receptacle is smaller in width than said floor by a width of between about 30 and 40 percent.

9. The method defined in claim 2, wherein in said closing step, said first mold half and said second mold half move along, respectively, first and second opposed parallel paths, and wherein said receptacle is formed by first and second insert projections on, respectively, said first and second mold halves.

* * * * *